May 24, 1927.

A. G. CARLSON 1,629,816

FLY AND INSECT TRAP

Filed April 24, 1926

Inventor
ALDER G. CARLSON

Patented May 24, 1927.

1,629,816

UNITED STATES PATENT OFFICE.

ALDER G. CARLSON, OF MOOSE LAKE, MINNESOTA.

FLY AND INSECT TRAP.

Application filed April 24, 1926. Serial No. 104,441.

This invention relates to fly and insect traps and the main object is to provide means of a simple, practical and efficient nature for catching and exterminating flies or other insects, and particularly those which have gained entrance into a house, store or other building, and which are buzzing or flying around at a window in an effort to get out. Further and more specific objects will be disclosed in the course of the following specification, reference being had to the accompanying drawing, in which.

Figure 1:
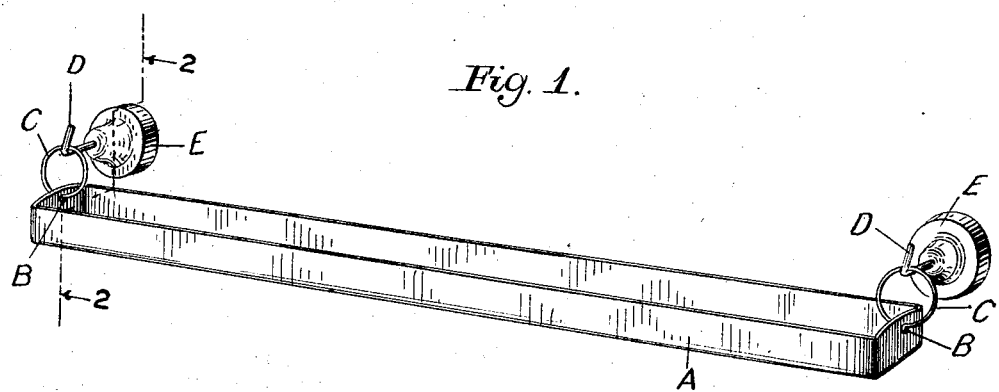
Fig. 1 is a perspective view of the device, detached.
Figure 2:
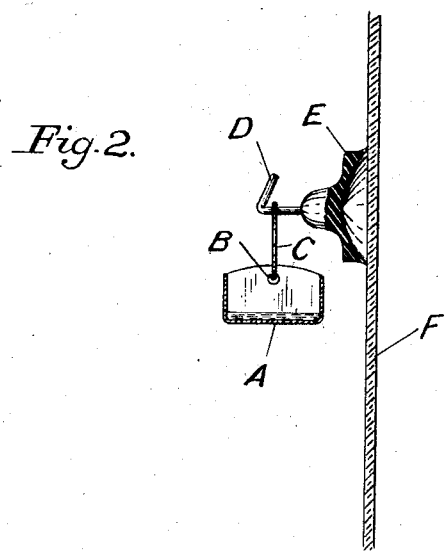
Fig. 2 is a sectional detail view, as on the irregular line 2—2 in Fig. 1, showing how the trap is attached to a window or other smooth supporting surface.

Referring to the drawing more particularly and by reference characters, A designates an elongated shallow tray or trough, the end walls of which are provided with perforations B in which engage small links or rings C. The rings C are hung upon hooks D which are imbedded in and project outwardly from a pair of suction cups E, which cups serve to secure the device in place, as upon a window glass F. By slightly moistening the cups E before pressing them in place they will quite rigidly adhere to any smooth surface.

As the flies in a room generally congregate about the windows thereof, that is the logical and most efficient place for locating the fly trap, and when placing it upon the window I have found it works to the greatest advantage when secured upon the window pane, about two-thirds or three-fourths of the way up from the lower end of the glass, where flies and other insects usually have a tendency to congregate more numerously than elsewhere on the pane. However, the trap works quite efficiently when installed anywhere on the pane, say from the bottom of the glass to within a short distance of the top of the glass.

It will be noted that there is a restricted passage-way or opening between the tray A and the window F, the object being to permit the flies to walk or fly up under the tray and adjacent to or on the window. As is well known, flies imprisoned on the inside of the window will continuously buzz up and down over its surface until they become tired at which time they will temporarily rest or settle down on the most convenient non-vertical support. With my device in place I have found that sooner or later they will invariably lodge in the tray A, and if they are further induced in doing so by placing some attractive or sweet material in the tray they are more quickly and effectively caught. The catching or killing substance placed in the tray may be of any suitable nature such as oil, soap suds, powders or other insect killing mixtures or poisons. When it is desired to clean or empty the tray this can readily be done by merely unhooking the rings C, after which the trough can be replenished and replaced in its same identical position.

It is understood that suitable modifications may be made in the general design and structural details of the invention as herein shown and described, provided, however, that said modifications come within the spirit and scope of the appended claims. Having now therefore fully shown and described my invention, what I claim to be new and desire to protect by Letters Patent is:

1. An insect trap comprising an elongated tray adapted to be arranged upon a window or other vertical support, and means for supporting the tray in a horizontal position, with its entire body in spaced relation with respect to the window or support so as to leave an elongated opening or passage between the tray and window or support.

2. An insect trap comprising a tray, for containing poison or the like, and means for suspending the same from a vertical support and in spaced relation thereto so as to provide a restricted vertical passage between the tray and the support.

3. An insect trap comprising a tray and means for detachably securing the same in a parallel position with respect to and spaced from a support having a vertical surface so as to leave a vertical passage between the tray and support.

4. An insect trap comprising a tray and means for detachably securing the same in a parallel position with respect to and spaced from a support having a vertical surface so as to leave a vertical passage between the tray and said surface, said securing means comprising suction members for engagement with said vertical surface.

In testimony whereof I affix my signature.

ALDER G. CARLSON.